Oct. 14, 1941.          J. C. WOODFORD          2,259,052
FLUID METER
Filed Dec. 19, 1939          2 Sheets-Sheet 1
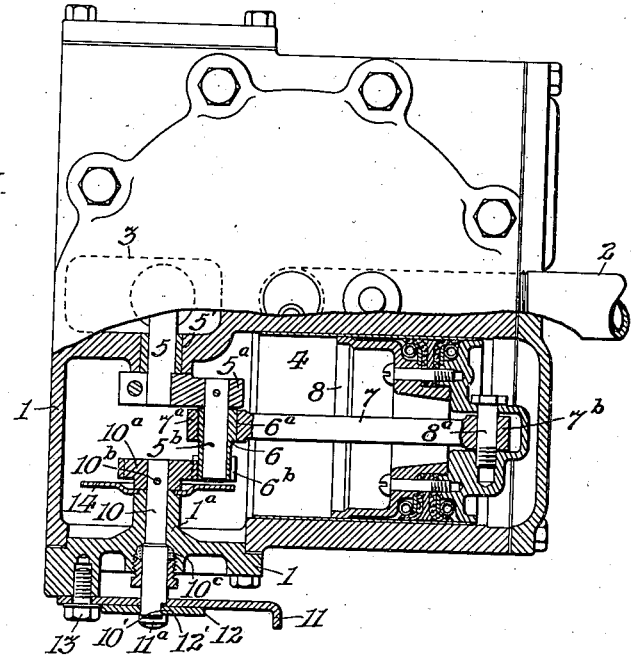
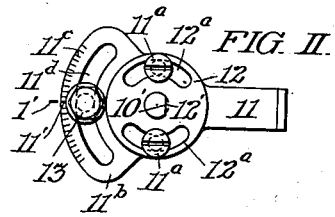
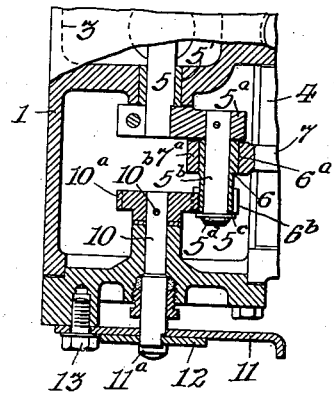
INVENTOR:
JOSEPH C. WOODFORD,
BY
Attorney.

Oct. 14, 1941.  J. C. WOODFORD  2,259,052
FLUID METER
Filed Dec. 19, 1939  2 Sheets-Sheet 2
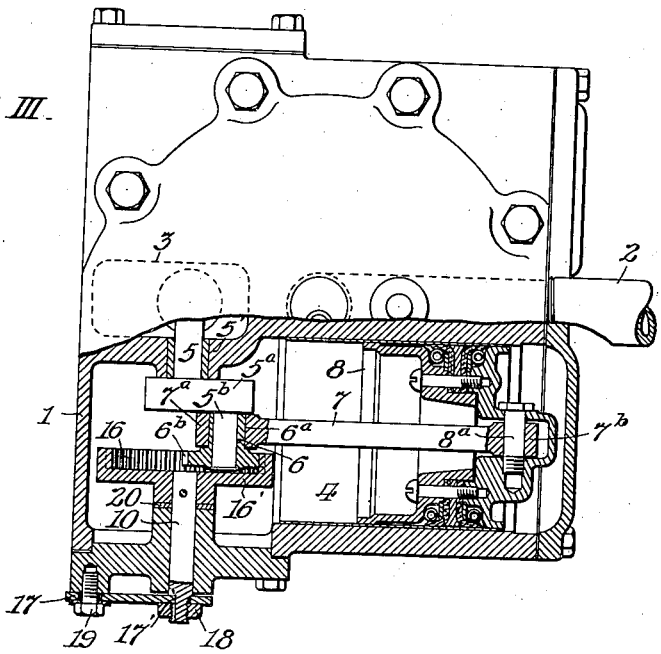
FIG. III.
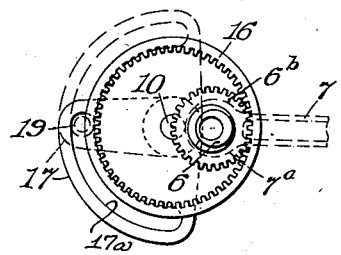
FIG. IV.
INVENTOR:
JOSEPH C. WOODFORD,
BY Arthur E. Paige,
Attorney Patented Oct. 14, 1941

2,259,052

UNITED STATES PATENT OFFICE 2,259,052

FLUID METER

Joseph C. Woodford, Wayne, Pa., assignor to John Wood Manufacturing Company, Inc., Conshohocken, Pa., a corporation of Delaware Application December 19, 1939, Serial No. 309,949

3 Claims. (Cl. 74—602)

My invention may be conveniently utilized in a meter operated by the flow of liquid in any liquid dispensing apparatus, for instance, in dispensation of lubricating oil or gasoline or other fuel oil. However, the essential features of my invention may be utilized in the construction of a fluid meter of the type disclosed in Letters Patent of the United States No. 2,003,901 granted June 4, 1935, to Parker et al. for Improvement in piston meters.

This invention is an improvement upon that disclosed in my co-pending application Serial No. 290,534 filed August 17, 1939, wherein Joseph E. Fernly is named as a joint inventor, and relates particularly to the means for securing in adjusted position means for varying the throw of a crank, whereby the length of the stroke of a piston may be varied to vary the amount of fluid passed through the piston cylinder during such stroke. In said pending application the means for the same purpose is a nut on a shaft which is continuously rotated during the operation of the meter. Therefore, as said nut is presented outside of the meter casing in order to be accessible for adjustment, it is necessary to provide a cap cover for it which must be removed to effect any desired adjustment for varying the throw of said crank. On the contrary, in accordance with my present invention the means for effecting such adjustment is carried by a normally stationary shaft and includes a lever fixed upon the end of said normally stationary shaft exterior to the meter casing and having an arcuate slot through which extends a cap screw in engagement with the meter casing, whereby the lever and said normally stationary shaft are secured in any desired position of variance of the throw of the crank.

The form of my invention chosen for illustration is embodied in a positive displacement meter, wherein the crank-shaft is axially aligned with said normally stationary shaft and has rigidly connected therewith an eccentric crank pin; which pin carries a bushing fitted for rotary adjustment thereon, which bushing is a sleeve, having a cylindrical outer surface eccentric to the axis of the pin. Said bushing extends through a bearing in one end of a connecting rod, the opposite end of which is pivoted in the piston, and said bushing has at one end thereof, besides said bearing, a gear which is concentric with the axis of the crank pin and meshes with a gear which is rigidly connected with said normally stationary shaft. Rotary adjustment of said normally stationary shaft with its gear effects rotary adjustment of said eccentric bushing on said crank pin and in its bearing in the piston rod, with the effect of predetermining and maintaining the desired length of stroke of the piston until the same is varied by adjustment of said lever.

My invention includes the various novel features of construction, arrangement, and method of operation hereinafter described.

In said drawings:

Fig. I is a partly elevational and partly sectional view of a displacement meter conveniently embodying my invention.

Fig. II is an elevation of the adjusting lever shown in Fig. I.

Fig. III is a view similar to Fig. I but showing a modified form of my invention wherein an internal gear is substituted for the external gear fixed on the inner end of the normally stationary shaft shown in Fig. I, and the adjusting lever is of simpler form than shown in Figs. I and II.

Fig. IV is an inside elevation of the adjusting lever and gearing shown in Fig. III.

Fig. V shows a modified form of abutment for the eccentric bushing.

Referring to the form of my invention shown in Figs. I and II; the casing 1 may be of any convenient form having a fluid inlet 2 and outlet 3 for the passage of fluid into and out of the piston chamber 4 in said casing. The crank-shaft 5 is journaled in the bearing 5' in said casing and has the arm 5$^a$ carrying the eccentric crank pin 5$^b$. Said pin 5$^b$ carries the bushing 6 fitted for rotary adjustment thereon, which bushing is a sleeve having a cylindrical outer surface 6$^a$ eccentric to the axis of said pin 5$^b$. Said bushing extends through the bearing 7$^a$ in one end of the connecting rod 7, the opposite end 7$^b$ of which is connected with the piston 8 by the pivot 8$^a$, so that it may be reciprocated in said piston chamber 4. Said bushing 6 has at one end thereof, beside said bearing 7$^a$, the gear 6$^b$ which meshes with the gear 10$^a$ which is rigidly connected, conveniently by the pin 10$^b$, with the normally stationary adjusting shaft 10. Said shaft 10 is conveniently in axial alignment with the crank-shaft 5 and journaled in the bearing 1$^a$ in the casing 1 and provided with the packing 10$^c$, through which said shaft 10 extends exterior to the casing 1.

The adjusting lever 11 is slip-fitted on the outer end of said shaft 10 so that it may turn freely thereon. The key plate 12 includes the key 12' which, as shown in Fig. II, engages the flattened portion 10' of the shaft 10 to turn the latter. Said lever 11 has the clamp screws 11$^a$ extending through respective arcuate slots 12ª in said key plate 12 so that said lever 11 and key plate 12 may be rigidly clamped together in any desired relatively rotary position.

The arcuate end 11ᵇ of said lever 11 is provided with a series of graduations 11ᶜ in coaxial relation with the arcuate slot 11ᵃ and said shaft 10. The central mark 11' in the series of graduations 11ᶜ corresponds with the intermediate position of the rotary eccentric sleeve 6 and the parts are calibrated so that in such intermediate position the mark 11' registers with the index mark 1' on the casing 1. The adjusting lever 11 is made separate from the key plate 12 and the clamp screws 11ª provided to permit such calibration. The locking screw 13 which is in screw threaded engagement with the casing 1, as shown in Fig. I, extends through the slot 11ᵈ in said lever so that the latter may be locked in any desired position of rotary adjustment of the eccentric sleeve 6 by tightening said screw 13.

I find it convenient to provide the bearing 1ª with the abutment disk 14 held thereon by the hub of the gear 10ª, to prevent accidental axial displacement of said bushing 6.

In the form of my invention shown in Figs. III and IV, the internal gear 16 is substituted for the gear 10ª shown in Fig. I, and its web 16' serves as an abutment to prevent axial displacement of the eccentric bushing 6 and its gear 6ᵇ shown in Fig. III.

Moreover, the adjusting lever 17, in Figs. III and IV, is directly engaged by its key 17' with the normally stationary adjusting shaft 10 and held on the latter by the nut 18. As shown in Fig. IV; said adjusting lever 17 has the arcuate slot 17ª in coaxial relation with said shaft 10. Said lever 17 may be locked in adjusted position by the lock screw 19 which extends through said slot 17ª in the casing 1, as shown in Fig. III. In that form of my invention; the sealing washer 20 interposed between the hub of the internal gear 16 and the bearing of the shaft 10 in the casing 1 is substituted for the packing 10ᶜ with the screw threaded gland shown in Fig. I.

When the adjusting lever 17 is in the position shown in full lines in Fig. IV, the eccentric bushing 6 is in position to afford the maximum length of stroke of the piston rod 7 and piston 8, but, when said lever is adjusted to the position shown in dash lines in Fig. IV, said eccentric bushing is adjusted to the position affording the minimum length of stroke of rod 7 and piston 8.

Fig. V shows a modified form of abutment for preventing accidental displacement of the eccentric bushing 6, including a washer 5ᶜ on the outer end of the crank pin 5ᵇ retained by the spring ring 5ᵈ seated in a circumferential groove in the crank pin. That form of my invention is simpler and therefore less costly than that shown in Fig. I, and permits the operator to see the gears 6ᵇ and 10ª when assembling them in mesh.

However, I do not desire to limit myself to the precise details of construction, arrangement, or method of operation herein set forth, as it is obvious that various modifications may be made therein without departing from the essential features of my invention as defined in the appended claims.

I claim:

1. In a positive displacement fluid meter having a casing containing a piston cylinder and a piston mounted to reciprocate in said cylinder; the combination with a crank-shaft having an eccentric pin for effecting reciprocation of said piston; of an eccentric bushing sleeve mounted to be turned on said pin and having a cylindrical outer surface in eccentric relation to the axis of said pin; a piston rod pivotally connected with said piston and with said bushing sleeve; a gear on one end of said bushing sleeve in concentric relation with the axis of said crank pin; a normally stationary shaft, in axial alignment with said crank-shaft, and having a gear rigidly mounted thereon and in mesh with said first gear; means at the outer end of said normally stationary shaft for turning it and thereby varying the eccentricity of the axis of said bushing sleeve with respect to the axis of said crank-shaft, including a key plate operatively engaging the outer end of said normally stationary shaft, a lever loosely mounted on the latter shaft, and a clamping screw carried by said lever and engaging said plate; and means for securing said lever in adjusted position in rigid relation with said casing.

2. A structure as in claim 1; wherein the lever has an arcuate slot, and the means for securing the lever is a locking screw extending through that slot in engagement with the casing.

3. In a positive displacement fluid meter having a casing containing a piston cylinder and a piston mounted to reciprocate in said cylinder; the combination with a crank-shaft having an eccentric pin for effecting reciprocation of said piston; of an eccentric bushing sleeve mounted to be turned on said pin and having a cylindrical outer surface in eccentric relation to the axis of said pin; a piston rod pivotally connected with said piston and with said bushing sleeve; a gear on one end of said bushing sleeve in concentric relation with the axis of said crank pin; a normally stationary shaft having a gear rigidly mounted thereon and in mesh with said first gear; means at the outer end of said normally stationary shaft for turning it and thereby varying the eccentricity of the axis of said bushing sleeve with respect to the axis of said crank-shaft; and means for securing said normally stationary shaft in adjusted position in rigid relation with said casing; including an abutment element in the casing preventing axial displacement of the bushing.

JOSEPH C. WOODFORD.